July 11, 1939.  C. F. WHITMAN  2,165,912
FEED TUBE AND PUSHER
Filed July 2, 1937
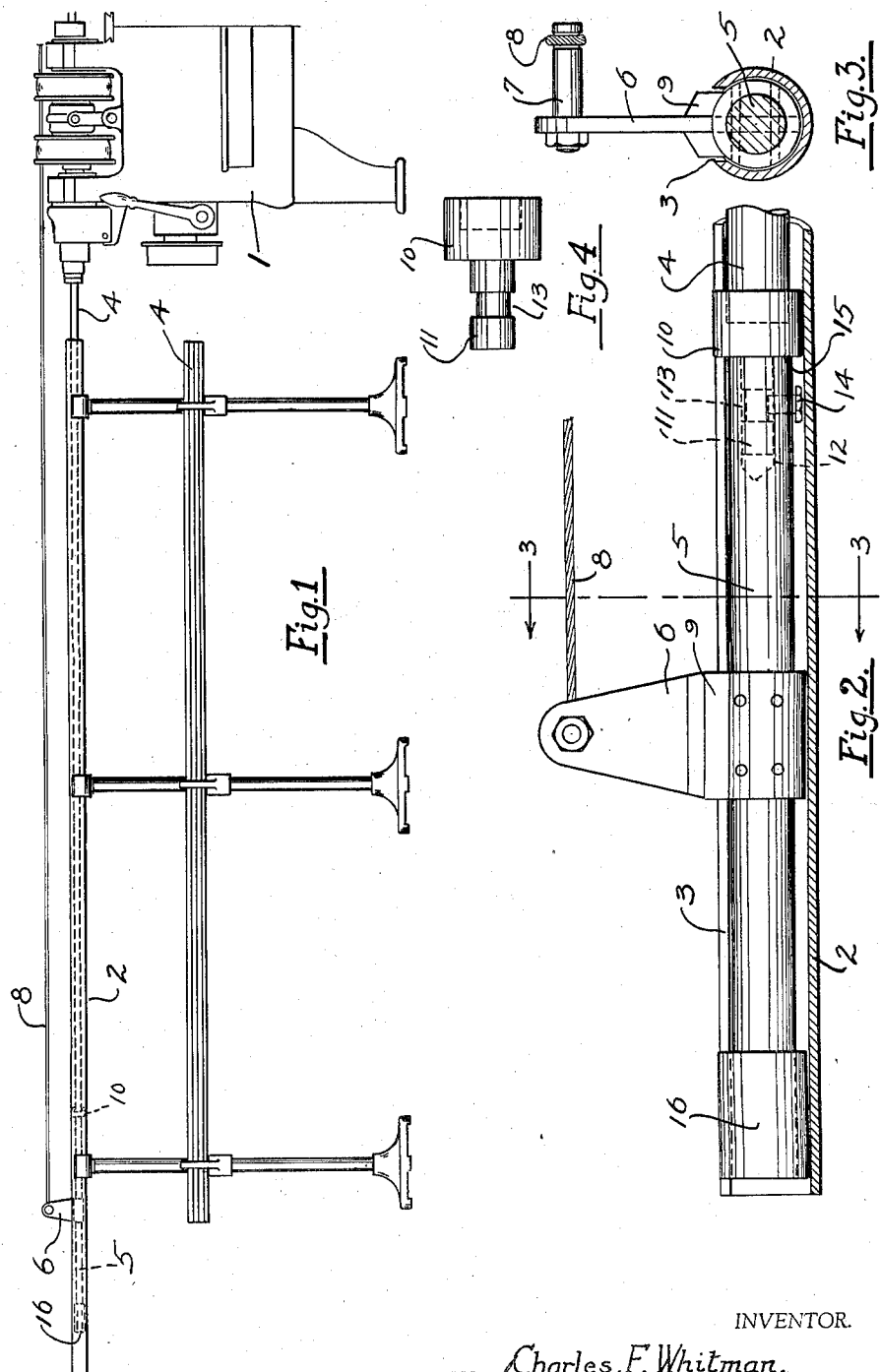
INVENTOR.
Charles F. Whitman.
BY Samuel Weisman
ATTORNEY.

Patented July 11, 1939

2,165,912

UNITED STATES PATENT OFFICE 2,165,912

FEED TUBE AND PUSHER

Charles F. Whitman, Detroit, Mich., assignor to Automatic Products Company, Detroit, Mich., a corporation of Michigan Application July 2, 1937, Serial No. 151,720

7 Claims. (Cl. 29—58)

The present invention pertains to a novel feed tube and pusher for metal working machines, particularly screw machines that are fed with long lengths of stock to be cut off and worked in the machine. A typical example is the manufacture of hexagon nuts of approximately one-half inch in length from a stock bar about twenty feet in length.

The stock bar is ordinarily supported in a tube or stock support appropriate length extending from the machine. The stock is inserted in the free end of the stock support, and consequently a space of about twenty feet in length beyond the stock support must be left clear for loading purposes.

The object of the present invention is to economize in factory space by eliminating the need of this long loading area beyond the receiving end of the stock support. This object is accomplished essentially by loading the stock support laterally through its wall and at a point somewhat removed from the bottom so that the stock bar may rest as usual on the bottom.

The conventional stock tube or feed tube has a lengthwise opening to accommodate the usual pusher assembly behind the stock bar. This opening is formed in the bottom of the feed tube and, obviously, is considerably narrower than the stock bar so that the latter will not fall therethrough. In the present invention, the loading opening is at least wide enough to receive the stock and is also used to accommodate the moving pusher assembly.

In order to prevent the stock bar from being caught in the opening while being worked, the invention provides a novel construction in the pusher assembly for receiving the rear end of the stock bar. The pusher is provided with a thimble that receives and retains the rear end of the stock bar and thereby holds the latter from being thrown into the opening. The thimble is preferably in the form of a tool steel insert in the pusher rod and is rotatably mounted to turn with the rotating stock bar. Being of tool steel, the thimble does not readily wear by any slip that may occur between it and the rapidly rotating stock.

The opening in the tube is preferably cut wide enough to admit the largest width of stock to be used in a given machine. Such width might be greater than the diameter of the conventional pusher rod, in which case the latter could not be operatively retained in the feed tube. To enable the use of standard pusher rods in such instances, the invention provides for the mounting of two or more rings or bushings tightly on the pusher rod and of such size that they cannot pass out of the opening.

The invention is fully disclosed by way of example by the following description and the accompanying drawing, in which:

Figure 1 is a side elevation of a screw machine equipped with a feed or stock tube according to the invention;

Figure 2 is a detail longitudinal section of the tube, showing also the pusher rod assembly in elevation;

Figure 3 is a section on the line 3—3 of Figure 2, and

Figure 4 is an elevation of the pusher thimble.

Reference to these views will now be made by use of like characters that are employed to designate corresponding parts throughout.

In Figure 1 the numeral 1 indicates a standard screw machine with a stock or feed tube 2 extending therefrom. The tube is formed with a lengthwise slot 3 of such width as to receive, preferably, the largest width of stock that can be handled by the machine. The stock for such machines is furnished in the form of a bar 4 of approximately twenty feet in length. Ordinarily, the feed tube is not slotted in the manner described above, and the stock is inserted through the rear or free end thereof. A clear space as long as the stock bar must be reserved beyond each tube, in ordinary practice, but is unnecessary with the present invention which permits lateral loading into the tube 2.

The preferred position of the slot 3 is at the top of the tube, but, within the terms and scope of the invention, may be at a lower level. The only requirement in this connection is that the bottom of the tube remain intact in order to support the stock bar, unless some auxiliary support or closure be provided.

Behind the stock bar 4, a pusher rod assembly is inserted in the tube 2. This device consists of a rod 5 having an arm 6 fastened thereto and extending upwardly through the slot 3. On the arm is formed or secured a laterally extending finger 7 to which is attached one end of a cable 8. The other end of the cable is wound up on a suitable mechanism within the machine 1 in the usual manner while the latter is in operation, so that the pusher assembly continually feeds the stock bar into the machine. The arm 6 is widened at the slot 3, as indicated by the numeral 9, in any suitable manner, in order to have a proper bearing in the slot.

Ordinarily, the slot for the pusher arm is formed in the bottom of the feed tube. Inasmuch as the stock bar is frequently of polygonal cross section, resting on the bottom of the tube and rotating at high speed, it strikes against the edges of such bottom opening and is likely to damage the tube or the stock or to impede the operation of the machine. The location of the opening away from the bottom of the tube, according to the present invention, eliminates this difficulty.

The operation of the machine 1 is such as to rotate the stock bar 4 rapidly and occasionally with a whipping action that is likely to throw the bar into the slot 3. In order to avoid such a contingency, the forward end of the pusher rod 5 is equipped with a flanged member or thimble 10 for receiving the rear end of the stock bar. Being thus retained at its rear end and having its forward end held in the machine, the stock bar is not likely to be thrown into the slot 3.

The thimble 10 is preferably mounted by means of an integral stem 11 inserted and rotatable in an axial hole 12 drilled in the forward end of the pusher rod 5. The thimble and stem are preferably formed of a hard material, such as tool steel, in order not to wear as a result of slippage between the thimble and the stock bar. The stem 11 has a peripheral groove 13 loosely receiving a retaining screw 14 mounted radially in the pusher rod 5, so that the thimble assembly is rotatable and yet does not pull out of the pusher rod. The pusher rod assembly is brought rather firmly against the rear end of the stock bar 4, causing the thimble to rotate with the stock bar, with a fairly accurate bearing in the hole 12. This is preferable to the usual rotation of the stock bar against the engaging end of the pusher rod. It will be seen that the groove 13 is somewhat elongated to receive the screw 14 notwithstanding wear between the back of the thimble and the forward tip 15 of the rod 5.

The width of the slot 3 is preferably such as to admit the largest diameter or shape of the stock that can be handled by the machine 1. The pusher rod 5 is likely to be pulled out of such a wide opening, and to prevent such an occurrence, the rod may be fitted with two or more rings 16 of greater outside diameter than the width of the opening. These rings are fitted on the rod before the latter is inserted in the rear end of the tube 2. In the construction shown in Figure 2, the thimble 10 has the same outside diameter as the ring 16, and in such case only one ring is necessary. If the pusher rod 5 is rather long, it may be expedient to use two or more rings for better bearing. Where only one ring 16, as in Figure 2, the thimble 10 is considered the equivalent of a second ring, for the purpose of the claims.

The word "tube" is used herein to signify an elongated, continuous stock support of any desirable cross sectional shape such as polygonal, circular, channel, etc., and is to be so understood throughout the specification and claims.

Although a specific embodiment of the invention has been illustrated and described, it will be understood that various alterations in the details of construction may be made without departing from the scope of the invention, as indicated by the appended claims.

What I claim is:

1. In a screw machine, an elongated continuous stock support extending horizontally therefrom for receiving an elongated stock bar, said support having a lengthwise opening at least as wide as the stock bar fed to said machine and narrower than the maximum internal dimension of said support, whereby said stock bar may be loaded into said support laterally through said opening, a pusher rod in said support, and a flanged member at the forward end of said rod for receiving the rear end of the stock bar.

2. In a screw machine, an elongated continuous stock support extending horizontally therefrom for receiving an elongated stock bar, said support having a lengthwise opening at least as wide as the stock bar fed to said machine and narrower than the maximum internal dimension of said support, whereby said stock bar may be loaded into said support laterally through said opening, a pusher rod in said support, and a flanged member at the forward end of said rod for receiving the rear end of the stock bar, said flanged member being of a harder material than the stock bar.

3. In a screw machine, an elongated continuous stock support extending horizontally therefrom for receiving an elongated stock bar, said support having a lengthwise opening at least as wide as the stock bar fed to said machine and narrower than the maximum internal dimension of said support, whereby said stock bar may be loaded into said support laterally through said opening, a pusher rod in said support, and a thimble rotatably mounted at the forward end of said rod and adapted to receive the rear end of the stock bar.

4. In a screw machine, an elongated continuous stock support extending horizontally therefrom for receiving an elongated stock bar, said support having a lengthwise opening at least as wide as the stock bar fed to said machine and narrower than the maximum internal dimension of said support, whereby said stock bar may be loaded into said support laterally through said opening, a pusher rod in said support, and a thimble rotatably mounted at the forward end of said rod and adapted to receive the rear end of the stock bar, said thimble being of a harder material than the stock bar.

5. In a screw machine, an elongated continuous stock support extending horizontally therefrom for receiving an elongated stock bar, said support having a lengthwise opening at least as wide as the stock bar fed to said machine and narrower than the maximum internal dimension of said support, whereby said stock bar may be loaded into said support laterally through said opening, a pusher rod in said tube, and a thimble at the forward end of said rod and having a stem rotatably mounted in said rod.

6. In a screw machine, an elongated continuous stock support extending horizontally therefrom for receiving an elongated stock bar, said support having a lengthwise opening at least as wide as the stock bar fed to said machine and narrower than the maximum internal dimension of said support, whereby said stock bar may be loaded into said support laterally through said opening, a pusher rod in said tube, and surrounding means on said rod and having a diameter exceeding the width of said opening.

7. In a screw machine, an elongated continuous stock support extending horizontally therefrom for receiving an elongated stock bar, said support having a lengthwise opening at least as wide as the stock bar fed to said machine and narrower than the maximum internal dimension of said support, whereby said stock bar may be loaded into said support laterally through said opening, a pusher rod in said support, and a plurality of rings on said rod and having a diameter exceeding the width of said opening.

CHARLES F. WHITMAN.